INFORMATION BUFFER INPUT CIRCUIT

Filed Dec. 3, 1962

INVENTOR.
ANDREW GABOR

BY Douglas M. Clarkson
ATTORNEY

United States Patent Office 3,262,102

Patented July 19, 1966

3,262,102

INFORMATION BUFFER INPUT CIRCUIT

Andrew Gabor, Port Washington, N.Y., assignor to Potter Instrument Company, Inc., Plainview, N.Y., a corporation of New York Filed Dec. 3, 1962, Ser. No. 241,763
3 Claims. (Cl. 340—172.5)

Figure 1:
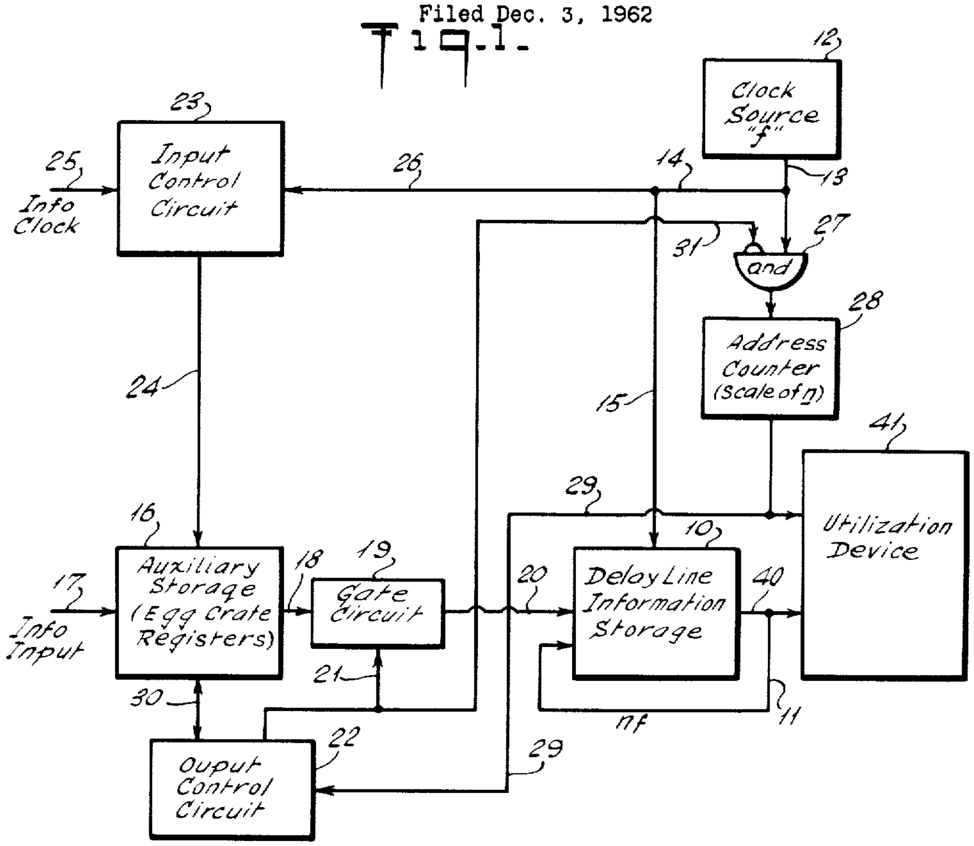

This invention, generally, relates to input circuitry to information processing apparatus and, more particularly, to an information buffer input circuit.

It is a principal object of this invention to provide an input circuit to accept information at any rate over a wide range of input rates.

Another principal object of this invention is to provide a circuit for more efficient use of information storage devices.

Still another object of the invention is to provide an information buffer input circuit to use delay lines efficiently for storage of information to achieve maximum information packing density.

Briefly, an input circuit in accordance with the invention includes a plurality of information storage circuits each having recirculating paths, and a clock source set for a predetermined fast recirculation rate for timing the recirculation of information in each of the storage circuits. A plurality of auxiliary information storage circuits include connections to receive information from an external source and means to pass information to the first-mentioned information storage circuits. Two separate control circuits are provided for the auxiliary information storage circuit, one being an input control responsive to external clock signals and also responsive to the first-mentioned clock source, and the other being an output control responsive to an address counter circuit. A separate circuit arrangement is provided to control the location of information fed into the first-mentioned information storage circuits, so that the information is inserted in a predetermined sequence.

Other objects and advantages of the invention will be pointed out in the following description and claims and illustrated in the accompanying drawings, which disclose, by way of example, the principle of the invention and the best mode, which has been contemplated, of applying that principle.

Figure 2:
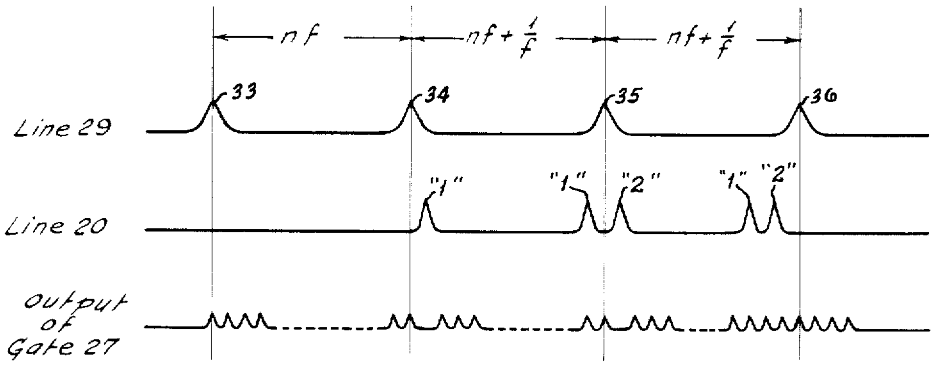

In the drawings:

FIG. 1 is a circuit diagram illustrating the interconnection of respective component circuits in accordance with the principles of the invention; and FIG. 2 is a pulse timing chart indicating a timing sequence for information input.

Referring now to FIG. 1, the illustrated arrangement of component circuits permits acceptance of information at any rate over a wide range of input rates, either synchronously or asynchronously, and over a frequency range of, for example, zero to 100 kilocycles.

While any suitable information storage circuits may be used to store information for time delay purposes in making up the circuit 10, a plurality of delay lines is indicated and these include input current drivers, output amplifiers and retiming circuit elements as well as various incidental components, which will be readily understood by one skilled in this art. While it is obvious that any desired number of separate delay lines may be used, for the purposes of this description, seven separate delay lines are selected. A path 11 is provided for recirculation of information in each delay line in the circuit 10.

A crystal controlled oscillator forms a clock source 12 to provide accurately timed output signals at a frequency which is designated "*f*". An output connection for the clock source 12 is indicated by the numeral 13 and is connected over line 14 and over line 15 for retiming the recirculating information in the circuit 10.

A plurality of auxiliary information storage devices form a circuit indicated generally by the numeral 16, and preferably, each storage device is in the form of a register known as an "egg crate" register. That is, each of the registers in the circuit 16 have input and output connections which are controlled separately.

Connections 17 provide means to insert information from an external data source, a separate input connection being provided for each register in the circuit 16. Since seven channels have been selected for the purpose of illustration, there will be seven separate input connections 17.

Each output connection 18 from the circuit 16 is connected through a gate circuit 19 for connection over lines 20 to the circuit 10. The gate circuit 19 is controlled by an enabling signal appearing over line 21 from an output control circuit 22, which will be described in greater detail presently.

An input control circuit 23 selects and controls, over a line 24, the storage of the information fed into the circuit 16 over the input connection 17, and the input control circuit 23 is responsive to the synchronization of an external information clock signal, fed in separately over line 25, with the internal clock source 12, connected over line 14 and line 26. Thus, the input control circuit 23 determines the position in the input registers of the circuit 16 in which the information input is to be stored.

The timing signals appearing on the line 13 from the clock source 12 are connected through an inhibit AND gate 27 for feeding into an address counter circuit 28 having a scale of *n* counts so that the address counter 28 counts through *n* separate clock pulses for each pulse fed over a line 29.

If information is detected over a line 30 as being available in the next storage position of the circuit 16, then the output control circuit 22 enables the gate 19 to pass this information into the circuit 10 where it is circulated rapidly. So that the information fed into the circuit 10 in this manner is fed in at the correct sequential position relative to the information already stored in the circuit 10, an inhibit signal is sent out by the output control circuit 22 over connection 31 to inhibit the AND gate 27.

In other words, when the output control circuit 22 detects information available in the registers of the circuit 16, the gate 19 is opened to pass such information and the beginning of the next cycle for the address counter 28 is delayed by an inhibit signal over connection 31.

The transfer of information into the delay lines of the circuit 10 in the proper sequence is best understood by referring to FIG. 2.

Assume that no information is in the input registers of the circuit 16 and no information is recirculating in the delay lines of the circuit 10, a first pulse 33 from the address counter 28 causes the output control circuit 22 to take a look at the first character storage position in the circuit 16. Since no information has been stored in the first character position in the circuit 16, no information will be transferred through the gate 19 to the circuit 10.

After *n* clock pulses have stepped the address counter 28 through its *n* stages, the next pulse 34 will be fed out over line 29, and assume that at this time character information is stored in the first position in the circuit 16. Upon detecting the existence of this stored information by means of line 30, the output control circuit 22 sends an enable signal to the gate circuit 19 permitting that information to be transferred to the circuit 10. At the same time, an inhibit signal is fed over line 31 to the AND gate 27 blanking out the next clock pulse from the counter 28.

Therefore, the stepping off of the address counter 28 over its *n* stages begins after one skipped position in the time scale, and the next output pulse from the address counter 28, indicated as pulse 35 in FIG. 2, occurs just after the first information stored previously in the circuit.

In response to this next pulse 35, the output control circuit 22 takes a look at the second character position in the circuit 16. Assume now that information is detected as being stored in the second character position.

Therefore, the gate circuit 19 is conditioned to pass that information to the delay lines of the circuit 10 appearing therein immediately after the first character information. The enabling of the gate circuit 19 is accompanied by a corresponding inhibit pulse over line 31 to the AND gate 27 which causes the address counter 22 to skip one more count, thereby beginning its *n* counts from the position in time of the second character information.

Since the clock pulses are indicated as being at the rate "*f*" and since the address counter has a scale of "*n*," the delay of the circuit 10 is "*nf*". Also, the spacing between the pulses 33 and 34 is "*nf*."

However, since the "*n*" count by the counter 22 skipped a count when an information character was transferred into the circuit 10, the next pulse 35 occurs $nf+1/f$ interval of time later. Due to the transfer in of the information "2" pulse, the initiation of the next "*n*" count series is delayed one position so that the pulse 36 appears after the information pulse "2."

Of course, if after a pulse such as 34 there is a sequence of information pulses, they all will be fed into the circuit 10 sequentially, and the next pulse 35 will be delayed until after an *nf* period subsequent to the last stored information pulse.

By this simple arrangement, information is fed into the delay line 10 where it is recirculated until it is fed out over line 40 to a utilization circuit 41 for processing to any desired end, such as actuating a high speed printer or possibly to store this information on tape.

The following claims are intended to define the valid scope of this invention over the prior art and to cover all changes and modifications falling within the true spirit and valid scope of the invention.

What is claimed is:

1. An information buffer input circuit comprising in combination;
   - first information storage means having an input means and an output means,
   - said first storage means being adapted to circulate data bits coupled to said input means back to said input means after a predetermined interval,
   - second information storage means having an input means and an output means,
   - means including said second storage input means for storing data bits at a first rate in said second information storage means,
   - means for periodically generating a control signal,
   - means responsive to said control signal for periodically removing from said second storage means a group of data bits stored therein and for coupling said group of data bits serially to the input means of said first information storage means at a second predetermined rate which exceeds said first rate,
   - said means for periodically generating a control signal including means responsive to the last bit in said data bit group,
   - said control signal generating means generating a control signal after a predetermined delay following said last bit coupled, and
   - said predetermined delay being equal to an integral number of said predetermined intervals plus the interval of said second rate.

2. An information buffer input circuit as set forth in claim 1 wherein said first information storage means is a delay line.

3. An information buffer input circuit as set forth in claim 2 further including means for generating clock pulses, said means for periodically generating said control signal including a counter for generating said control signal after counting a predetermined number of said clock pulses, and said means responsive to the last bit in said group includes means for inhibiting said counter for one clock pulse duration for each bit in said group.

References Cited by the Examiner

UNITED STATES PATENTS

| | | | |
|---|---|---|---|
| 2,905,930 | 9/1959 | Golden | 340—172.5 |

ROBERT C. BAILEY, *Primary Examiner.*

G. D. SHAW, *Assistant Examiner.*